(12) United States Patent
Truax et al.

(10) Patent No.: US 6,682,021 B1
(45) Date of Patent: Jan. 27, 2004

(54) SYSTEM AND METHOD FOR ACTIVELY MANIPULATING AND CONTROLLING FLUID FLOW OVER A SURFACE

(75) Inventors: Philip P. Truax, Fort Worth, TX (US); Daniel N. Miller, Bainbridge Island, WA (US); Jeffrey W. Hamstra, Fort Worth, TX (US); Patrick J. Yagle, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/117,706

(22) Filed: Apr. 5, 2002

Related U.S. Application Data (63) Continuation of application No. 09/354,866, filed on Jul. 16, 1999.

(51) Int. Cl.$^7$ ................................................ B64C 1/38
(52) U.S. Cl. ...................... 244/201; 244/199; 244/203; 244/204; 138/38
(58) Field of Search ............................... 244/53 R, 198, 244/199, 200, 201, 203, 204, 130; 138/37–38

(56) References Cited

U.S. PATENT DOCUMENTS

| | | | |
|---|---|---|---|
| 4,463,772 A | 8/1984 | Ball | 137/15.2 |
| 4,516,747 A | 5/1985 | Lurz | 244/204 |
| 4,650,138 A | * 3/1987 | Grose | 244/200 |
| 4,706,910 A | * 11/1987 | Walsh et al. | 244/200 |
| 4,759,516 A | * 7/1988 | Grose | 244/200 |
| 4,989,807 A | 2/1991 | Foreman et al. | 244/53 B |
| 5,133,516 A | 7/1992 | Marentic et al. | 244/130 |
| 5,133,519 A | 7/1992 | Falco | 244/200 |
| 5,447,283 A | 9/1995 | Tindell | 244/207 |
| 5,542,630 A | 8/1996 | Savill | 244/200 |
| 5,803,409 A | 9/1998 | Keefe | 244/206 |
| 5,894,990 A | 4/1999 | Glezer et al. | 239/423 |
| 5,964,433 A | 10/1999 | Nosenchuck | 244/205 |
| 6,193,191 B1 | * 2/2001 | Falcimaigne et al. | 244/200 |

FOREIGN PATENT DOCUMENTS

| | | | |
|---|---|---|---|
| EP | 0 726 398 A1 | 2/1996 | F15D/1/12 |
| GB | 2 191 606 A | 4/1987 | F01D/17/00 |

OTHER PUBLICATIONS

XP–002152120, Kawai T. et al.; "Secondary flow control and loss reduction in a turbine cascade using endwall fences"; JSME Int. J. II Fluids Engineering, Heat Transfer, Power, Combustion, Thermophysical Properties, Aug. 1989 (Japan); Abstract Only.

XP–002152121, Vakili A.D. et al.; "Flow control in a diffusing S–duct"; Compendex/E1; University of Tennessee Space Inst., Tullahoma, TN; Abstract Only.

XP–002152122, Michihiro, Nishi et al.; "Separation control in a conical diffuser by vortex generator jets"; Transactions of the Japan Society of Mechanical Engineers, Part B, Jan. 1997; Abstract Only.

XP–002152123, Xiao Chen et al.; "Flow characteristics and flow control for high aspect ratio and highly curved S–bend diffuser"; Journal of Propulsion Technology, Dec. 1991; Abstract Only.

* cited by examiner

*Primary Examiner*—Galen L. Barefoot
(74) *Attorney, Agent, or Firm*—Koestner Bertani, LLP (57) ABSTRACT

The present invention provides a system and method for actively manipulating and controlling aerodynamic or hydrodynamic fluid flow over a surface. More specifically, the present invention provides a system and method to control aerodynamic or hydrodynamic fluid flow behavior of a ducted fluid flow using very-small-scale effectors. The system and method for actively manipulating and controlling fluid flow over a surface includes the placement of arrays of very-small-scale effectors on ducted surfaces bounding the ducted fluid flow. These very-small-scale effectors are actively manipulated to control the flow behavior of the ducted fluid flow and prevent flow separation within the primary fluid flow.

19 Claims, 7 Drawing Sheets

SYSTEM AND METHOD FOR ACTIVELY MANIPULATING AND CONTROLLING FLUID FLOW OVER A SURFACE

RELATED APPLICATIONS

This application is a continuation of U.S. patent application Ser. No. 09/354,866, filed Jul. 16, 1999 entitled: "System and Method for Manipulating and Controlling Fluid Flow Over A Surface," and is incorporated herein by reference in its entirety.

TECHNICAL FIELD OF THE INVENTION

This invention relates generally to manipulating fluid flow over a surface. More specifically, this invention relates to actively manipulating fluid flow over an aerodynamic or hydrodynamic surface. The fluid flow over the surface is manipulated with small-scale actuators at the surface, wherein these small-scale actuators may be actively controlled by an associated control system to modify and achieve a desired fluid flow behavior over the surface.

BACKGROUND OF THE INVENTION

One of the most commonly used methods to control local boundary layer separation within ducted systems is the placement of vortex generators upstream of the layer separation. Vortex generators are small wing like sections mounted on the inside surface of the ducted fluid flow and inclined at an angle to the fluid flow to generate a shed vortex. The height chosen for the best interaction between the boundary layer and the vortex generator is usually the boundary layer thickness. The principle of boundary layer control by vortex generation relies on induced mixing between the primary fluid flow and the secondary fluid flow. The mixing is promoted by vortices trailing longitudinally near the edge of the boundary layer. Fluid particles with high momentum in the stream direction are swept along helical paths toward the duct surface to mix with and, to some extent replace low momentum boundary layer flow. This is a continuous process that provides a source to counter the natural growth of the boundary layer creating adverse pressure gradients and low energy secondary flow accumulation.

The use of vortex generators in curved ducts to reduce distortion and improve total pressure recovery has been applied routinely. Many investigations have been made in which small-geometry surface configurations effect turbulent flow at the boundary layers. Particular attention has been paid to the provision of so-called riblet surfaces in which an array of small longitudinal rib-like elements known as riblets extend over the turbulent boundary layer region of a surface in the direction of fluid flow over the surface, to reduce momentum transport or drag. Experimental results indicate that net surface drag reductions of up to about 7% can be achieved. However, these structure used to induce vortices are fixed and provide no mechanism to manipulate the vortex generation needed to improve a dynamic flow condition.

As computers increasingly leaved fixed locations and are used in direct physical applications, new opportunities are perceived for applying these powerful computational devices to solve real world problems in real time. To exploit these opportunities, systems are needed which can sense and act. Micro-fabricated Electro-Mechanical Systems (MEMS) are perfectly suited to exploit and solve these real world problems.

MEMS offer the integration of micro-machined mechanical devices and microelectronics. Mechanical components in MEMS, like transistors in microelectronics, have dimensions that are measured in microns. These electromechanical devices may include discrete effectors and sensors. More than anything else, MEMS is a fabrication approach that conveys the advantages of miniaturization, multiple components and microelectronics to the design and construction of integrated electro-mechanical systems.

To utilize an individual MEMS device to control or manipulate microscopic conditions can be useful.

However, it would be desirable to achieve macroscopic effects by manipulating microscopic conditions. These microscopic effects can be achieved by MEMS passively or by actively manipulating these devices. Furthermore, in a system utilizing active manipulation, it may be desirable to utilize a sophisticated control system in conjunction with a large array of MEMS devices to control and manipulate such macroscopic effects.

SUMMARY OF THE INVENTION

The present invention provides a system and method for actively manipulating and controlling fluid flow over a surface that substantially eliminates or reduces disadvantages and problems associated with previously developed systems and methods used of fluid flow control.

More specifically, the present invention provides a system for a method to control flow behavior of a ducted fluid flow using small scale actuators. The system and method for actively manipulating and controlling fluid flow over a surface includes the placement of arrays of small-scale actuators on ducted surfaces bounding the ducted fluid flow. These small scale actuators are actively manipulated to control the flow behavior of the ducted fluid flow.

In a second embodiment, these very-small-scale effectors are actively manipulated to control the flow behavior of the fluid flow and prevent natural flow separation within the primary fluid flow.

An additional embodiment of the present invention includes the use of MEMS devices as the very-small-scale effectors. In this case the very-small-scale effectors are smaller than a duct boundary layer thickness of a ducted fluid flow. Furthermore these very-small-scale effectors may be dimensioned at an order of one-tenth of the boundary layer thickness.

A third embodiment of the present invention further senses the flow conditions within in the primary and secondary fluid flow, with a flow sensor system. This relieves computational burdens imposed by prior art systems which failed to sense actual conditions and relied on computationally intensive mathematical models to determine the fluid flow conditions. Further, this eliminates the inaccuracies associated with such mathematical models and provides real time actual feedback. A control system is employed to actively direct the array of very-small-scale effectors in response to the sensed flow conditions to produce a desired fluid flow within the ducted fluid flow.

Manipulating boundary layer conditions for a ducted fluid flow expands the possible geometries available for ducting systems used to contain such a fluid flow. This is highly desirable where exotic geometries are required. One example of such use may be in a low-observable tactical aircraft. However, the present invention need not be limited to tactical aircraft as low-observable technology has many applications as known to those skilled in the art.

Manipulating ducted fluid flow can result in reduced fatigue and cyclical stress effects on downstream components located within the fluid flow, such as an aircraft engine or turbine, as the adverse pressure gradients within the duct can be minimized or eliminated. Included in the present invention is the possibility of using effectors that are actively controlled either as pulsating effectors that are either on or off (non-pulsating) or are actively controlled through a system that uses small sensors (like MEMS) to control the effectors.

The operational performance of components, such as an aircraft engine or turbine, located within the ducted fluid flow can be enhanced by actively monitoring and controlling the fluid flow behavior to prevent operational failures such as engine stalling induced by fluid flow through the engine.

The present invention provides an important technical advantage by allowing a dynamic primary fluid flow to be manipulated by an array of very-small-scale effectors to achieve a greater pressure recovery of the primary fluid flow.

The use of vortex generators in curved ducts to reduce distortion and improve total pressure recovery has been applied routinely. Recent investigations have shown that a "global" approach to the application of convention size vortex generators or vertex generator jets works better than the older approach which was specifically aimed at the prevention of boundary layer flow separation. The present invention applies to the use of very-small-scale devices (effectors) to accomplish this "global" approach to flow control. The present invention provides another technical advantage by preventing or limiting natural flow separation within a ducted fluid flow. This is achieved by manipulating an array of very-small-scale effectors according to conditions sensed within the fluid flow to achieve a macroscopic effect. Individually, these very-small-scale effectors induce vortex generation at the boundary layer. These vortices induce mixing between the primary fluid flow and the secondary fluid flow. The mixing is promoted by vortices trailing longitudinally near the edge of the boundary layer. Fluid particles with high momentum in the stream direction are swept along helical paths toward the duct surface to mix with and, to some extent replace low momentum boundary layer flow. By manipulating the vortex generation across an array of very-small-scale effectors, a macro-scale source to counter the natural growth of the boundary layer, thereby eliminating adverse pressure gradients and low energy secondary flow accumulation within the primary fluid flow. In an additional embodiment, since the induction of these vortices can be actively controlled, it is possible for the present invention to respond to changing conditions effecting the dynamic fluid flow.

Moreover, the present invention provides yet another technical advantage by allowing a greater flexibility in the design of a ducting system to be associated with the primary fluid flow. This flexibility allows both inlet and exhaust ducting to take exotic or serpentine shapes as is often required by other engineering design constraints, such as those imposed in the design of a low-observable tactical aircraft.

Yet another technical advantage provided by the present invention, when applied to a low-observable design flexibility in providing ducting systems optimized to minimize radar reflections, disperse exhaust signatures, and provide adequate airflow to the components located within the ducted fluid flow of a low-observable tactical aircraft.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGURES, like numerals being used to refer to like and corresponding parts of various drawings.

The present invention provides a system and method for manipulating aerodynamic or hydrodynamic fluid flow over a surface that substantially eliminates or reduces disadvantages and problems associated with previously developed systems and methods used of fluid flow control.

More specifically, the present invention provides a system and method to prevent or minimize the natural boundary layer separation of an aerodynamic or hydrodynamic fluid flow through the use of very-small-scale effectors. The system and method for preventing or minimizing this boundary layer separation within a fluid floe over a surface includes the placement of arrays of very-small-scale effectors on ducted surfaces bounding ducted fluid flow. These very-small-scale effectors manipulate the flow behavior of the ducted fluid flow and prevent flow separation within the primary fluid flow.

The present invention enables new and improved designs of low-observable tactical aircraft. Low-observable in part takes into consideration such as detection by radar and the radar cross section associated with a low-observable aircraft.

One method to detect aircraft involves the use of radar. However, not all objects or aircraft reflect the same amount of radar waves, as is known by those skilled in the art. In a low-observable aircraft one would want to reflect as little radar energy as possible to a radar receiver, enabling the plane to go undetected at closer ranges. The amount of radar energy that is reflected by an object can be defined by its radar cross-section. To define the radar cross-section of a target, one calculates the size of a sphere which would reflect the same amount of radar energy as the aircraft that was measured. The radar cross-section in the square meters is then the area of a circle of the same diameter as the imaginary sphere.

Radar cross-section is not necessarily defined by aircraft size, but is more closely related to its design and construction. Curved surfaces reflect energy in many directions. Therefore, curved surfaces have been historically avoided in favor of flat surfaces. Flat surfaces, like the facets of a diamond, reflect energy in the limited directions of the designers' choice-namely, away from detecting receivers for a low observable aircraft. AS the computation power of computers have increased designers need no longer be limited to faceted surfaces, rather surfaces, including curved surfaces, may be modeled and optimized to minimize the amount of radar energy reflected to a detecting receiver.

One problem source of radar signatures from aircraft has been associated with the engine ducting. In some instances this has been used as an identifier of the aircraft. Modem radars can look down engine inlets to bounce returns off the highly reflective compressor blades (an in many cases identify them by counting the rotating blades).

Figure 1A:
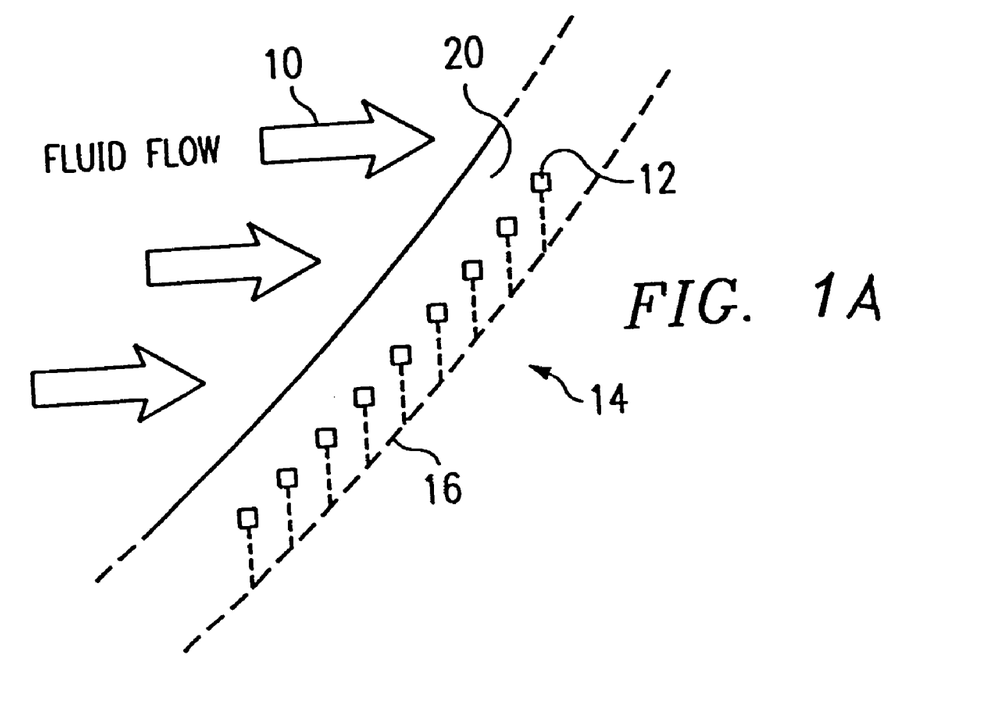
FIG. 1A illustrates conceptually a passive embodiment of the present invention.

Radar, however, is not the only method of aircraft detection. To reduce their vulnerability to heat-seeking detection systems, low-observable aircraft may use slit-like exhausts. Exhaust may emerge in cool, diffuse fans rather than hot, concentrated streams FIG. 1A illustrates conceptually one embodiment of the present invention. FIG. 1A describes a fluid flow 10, which may be an air, gas or liquid, flowing over surface 20, wherein surface 20 has an array of very-small-scale effectors 12. Array 14 of very-small-scale effectors 12 allows the flow characteristics of fluid flow 10 to be manipulated as it flows over surface 20. Fluid flow 10 will separate into primary flow 10A and secondary flows 10B.

The very-small-scale devices (on the order of one-tenth of the boundary layer thickness) can be fixed (effectors) like miniature vortex generators or vortex generator jets. The miniature vortex generators can be fabricated in many ways including MEMS techniques or applied as an applique or cast into the surface.

Figures 1B, 2A:
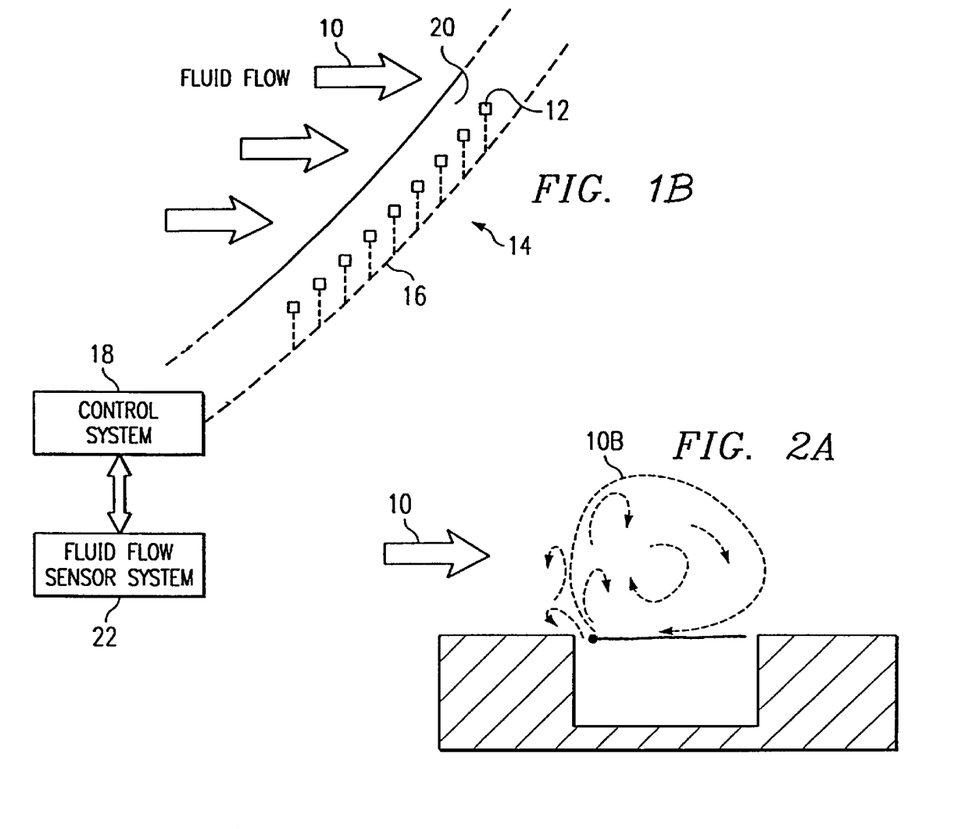
FIG. 1B illustrates conceptually an active embodiment of the present invention.
FIG. 2A depicts a fludic effector.

In a second embodiment, illustrated in FIG. 1B, array 14 of very-small-scale effectors 12 are linked to a control system 18 by a communication pathway 16. Communication pathway 16 may be a hard-wired system, a fiber optic system, a wireless communications system, or the like, as known to those skilled in the art. Control system 18 will also receive input from a fluid flow sensor system 22. Fluid flow sensor system 22 will provide data on flow characteristics of fluid flow 10 (including primary fluid flow 10A and second fluid flow 10B) to control system 18. Fluid flow sensor system 22 may detect the flow behavior characteristics of fluid flow 10 within the fluid flow, or the fluid flow sensor system 22 may comprise a series of sensors mounted on surface 20.

Array 14 is composed of several very-small-scale effectors 12. Very-small-scale effectors 12 will be smaller than the boundary layer thickness of the fluid flow 10 over surface 20. In some instances and embodiments, very-small-scale effectors 12 may be one-tenth the thickness of the boundary layer or smaller. For this reason, microfabricated electromechanical structures (MEMS) are chosen for these very-small-scale effectors 12.

Figure 2B:
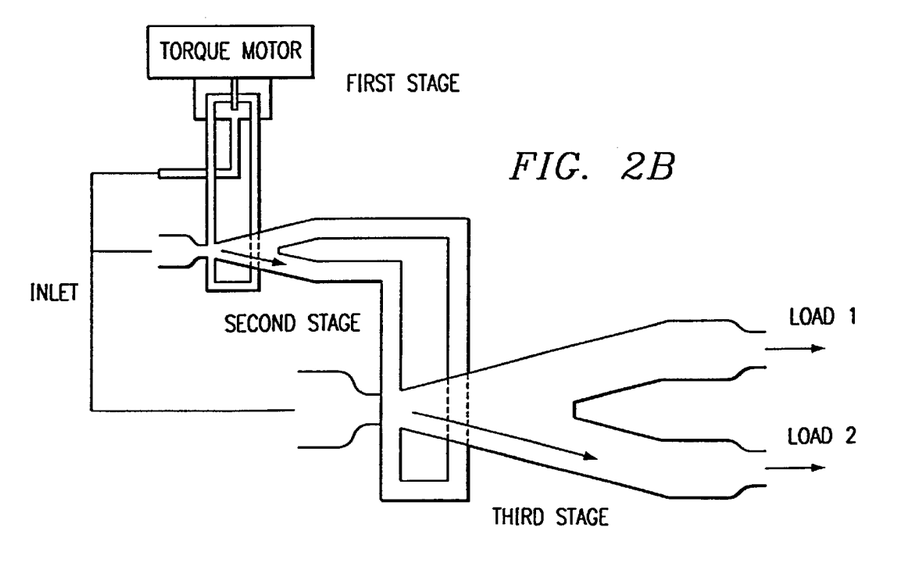
FIG. 2B depicts a pulsing effector.

FIGS. 2A–2D illustrate many examples of microfabricated electro-mechanical structures (MEMS) which may be used as these very-small-scale effectors. FIG. 2A depicts a fluidic effector creating secondary flows 10B as primary fluid flow 10 passes over fluidic effector 24. FIG. 2B depicts a pulsing effector. A fluidic oscillator alternates flow between two outflow legs by injecting high pressure on either side of the nozzle orifice. Injecting at Input 1 causes flow to exit the device at Output 2, and injecting at Input 2 causes flow to exit the device at Output 1. The Input flow can come from a like, but smaller device (Second Stage) or from a mechanically driven valve (First Stage).

Figure 2C:
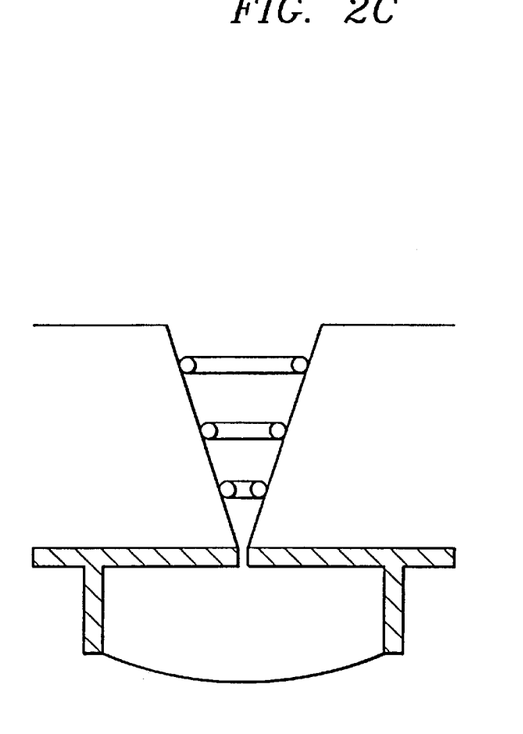
FIG. 2C depicts a synthetic jet effector.
Figure 2D:
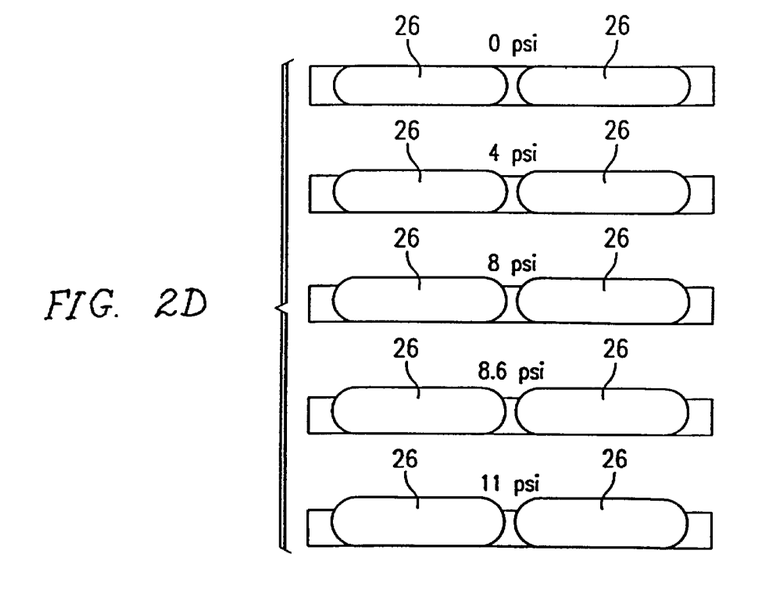
FIG. 2D depicts a microbubble effector.

FIG. 2D depicts a synthetic jet effector. This type of effector uses a vibrating diaphragm which bounds a cavity to generate an air jet. The oscillating surface draws fluid into the cavity from all directions and then expels it in a narrow jet. The resultant pulsed jet has no net mass flow. FIG. 2E presents a micro-bubble effector where micro-bubbles 20 expand based on internal pressure to manipulate secondary flow 10B. The effectors listed above are examples of possible MEMS devices which may be used to manipulate primary fluid flow 10. These very-small-scale effectors may be placed in arrays on surface 20 and controlled by control system 18 coupled to array 14 via communication pathway 16. Any of these very-small-scale effectors 12 may be used to induce and manipulate vortex formation to control the natural layer separation within the fluid flow 10.

Surface 20 need not be limited to a free surface. In many instances, surface 20 will be part of a ducted surface, as illustrated in FIGS. 3A and 4A.

Figure 3A:
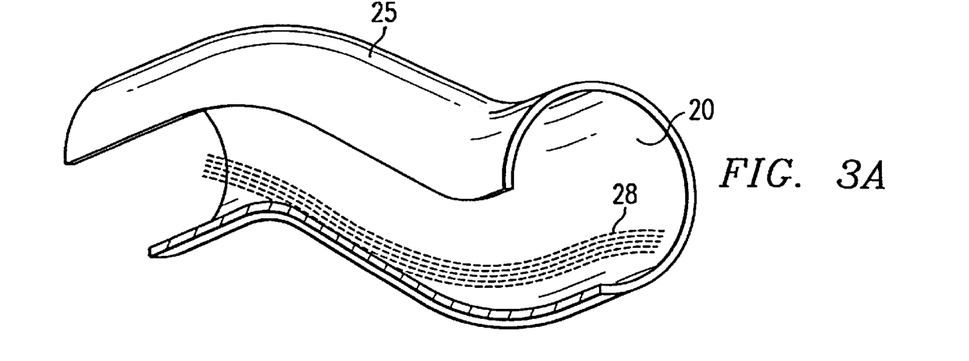
FIG. 3A illustrates flow conditions within a serpentine duct without the present invention.
Figure 3B:
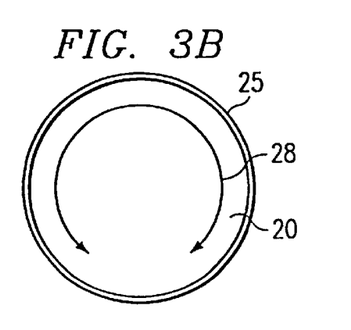
FIG. 3B illustrates secondary flow characteristics within a serpentine duct not using the present invention.
Figure 3C:
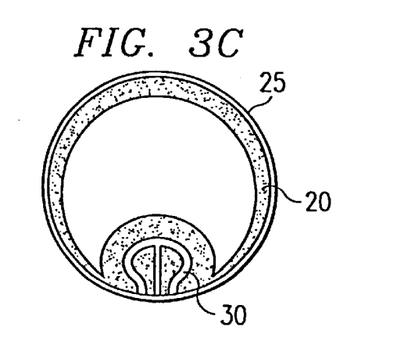
FIG. 3C is a cross section depicting pressure gradients within a serpentine duct without the use of the present invention.
Figure 4A:
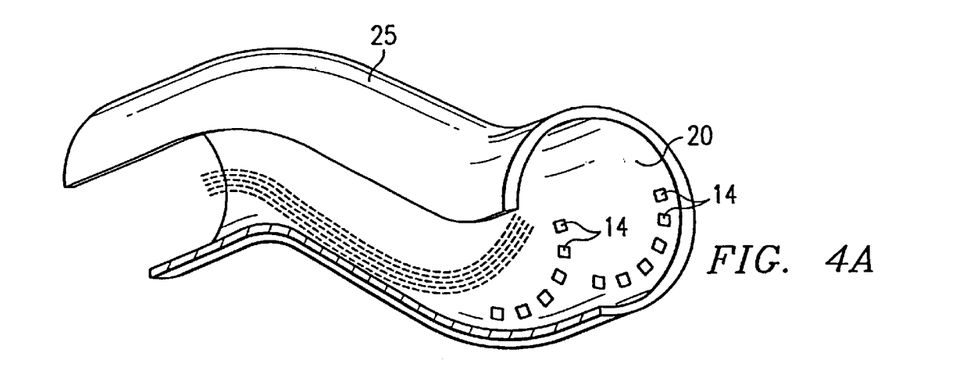
FIG. 4A illustrates flow conditions within a serpentine duct with the present invention

FIG. 3A depicts a serpentine duct 25 with no control of the secondary flow behavior 10B of fluid flow 10 within this duct 25. Lines 28 indicate instabilities or pressure holes (low pressure areas) 30 within fluid flow 10 within duct 24. FIG. 3B illustrates the natural secondary flow characteristic 28 within duct 25.

Figure 4B:
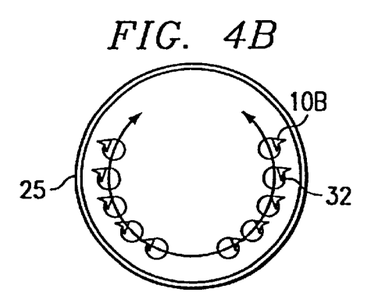
FIG. 4B illustrates secondary flow characteristics within a serpentine duct using the present invention.
Figure 4C:
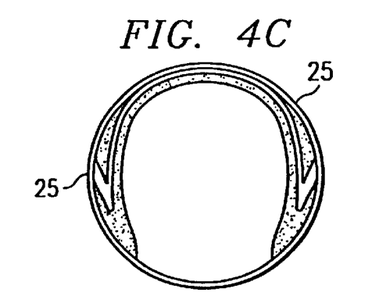
FIG. 4C is a cross section depicting pressure gradients within a serpentine duct with the use of the present invention.

FIG. 4A again illustrates a serpentine duct 25. However, this serpentine duct has arrays 14 of very-small-scale effectors 12 within the ducted surface 20 of duct 25. FIG. 4B presents the modified secondary flow 10B characteristic illustrating co-rotating vortices 32. These secondary flows result in minimizing or preventing any low pressure hole formation within fluid flow 10 within duct 25 as illustrated by FIG. 4C. This illustrates how a duct having low-observable characteristics can benefit from the use of very-small-scale effectors to improve fluid flow behavior within duct 25.

Figure 5A:
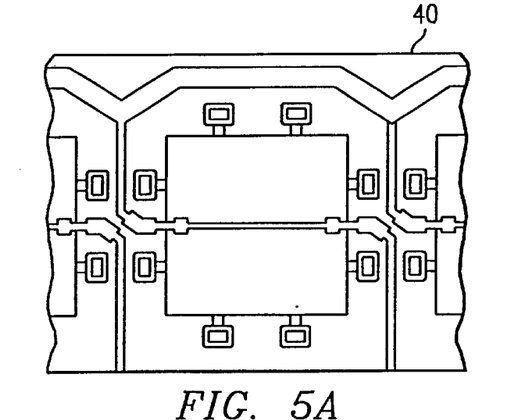
FIG. 5A depicts a MEMS hear sensor.
Figure 5B:
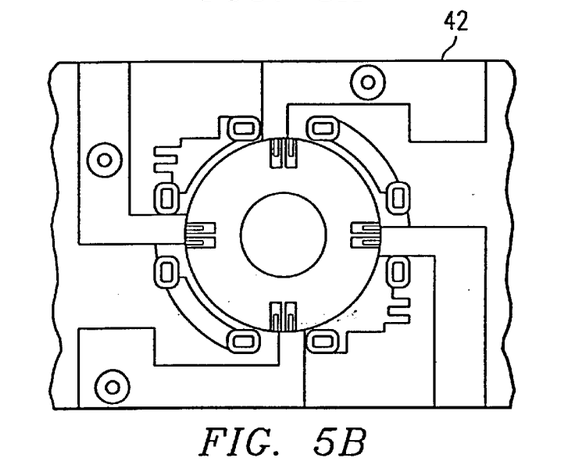
FIG. 5B depicts a MEMS pressure sensor.
Figure 5C:
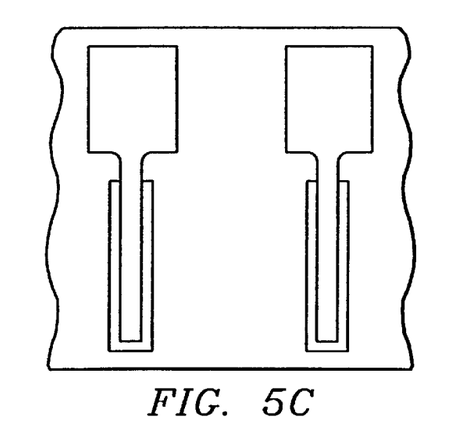
FIG. 5C depicts a MEMS velocity sensor.
Figure 6:
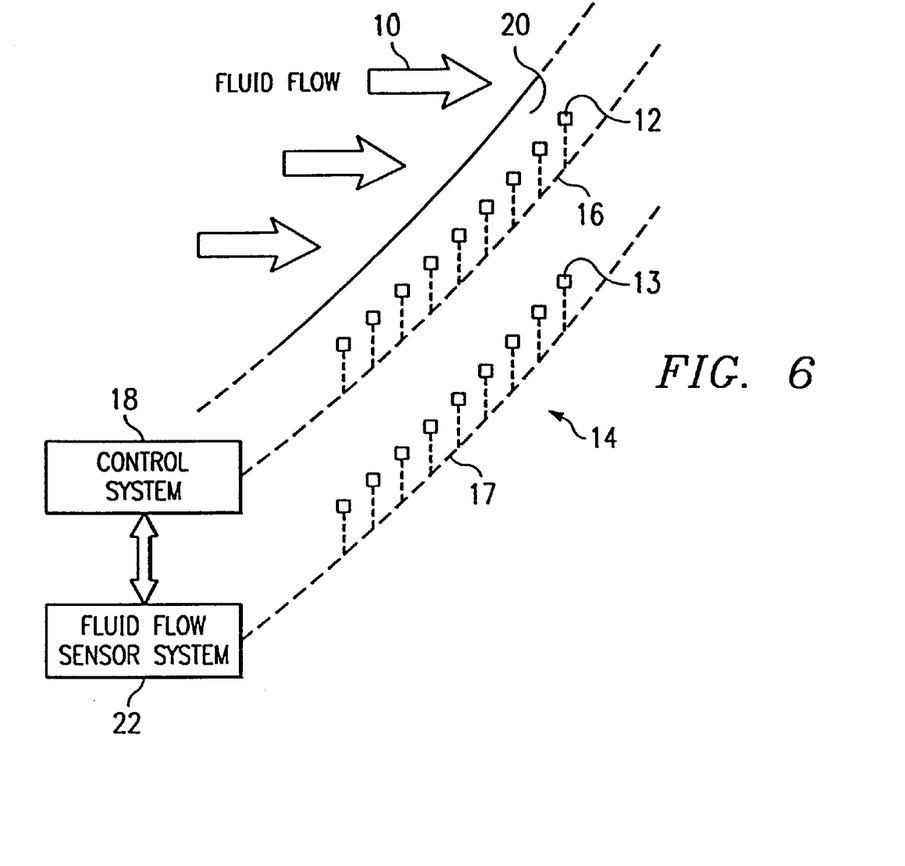
FIG. 6 depicts an embodiment of the present invention similar to FIG. 1, wherein flow sensors are incorporated on the surface over which the flow takes place.

Flow control system 18 will receive its input from a sensor system 22. Sensor system 22 may receive input from conventional flow sensors and the like as known to those skilled in the art or microfabricated electro-mechanical sensor devices such as those illustrated in FIGS. 5A, 5B and 5C. FIG. 5A illustrates a MEMS sheer sensor 40. This device functions in a manner similar to a hot-film shear stress sensor. A small surface flush with the duct wall is maintained at a constant temperature. The heat flex at the duct wall is then measured. This heat flux can be calibrated to shear stress. FIG. 5B depicts a MEMS pressure sensor 42. FIG. 5C indicates a velocity sensor. This device functions in a manner similar to hot-wire anemometers. Electric current is passed through a metal element exposed to the fluid flow. The fluid flow convectively cools the element, effecting a change in its electric resistance. This change in resistance can be related to the velocity magnitude at the sensor through calibration. These sensors may be incorporated into array 13 and communicate to the control system via communication pathways 17 as depicted in FIG. 6. Additionally, these sensors may be placed elsewhere within fluid flow 10 or may be sensing external flow relative to surface 20. In the case of a ducted fluid flow, sensors may sense the orientation of flow external to duct 25.

Figure 7:
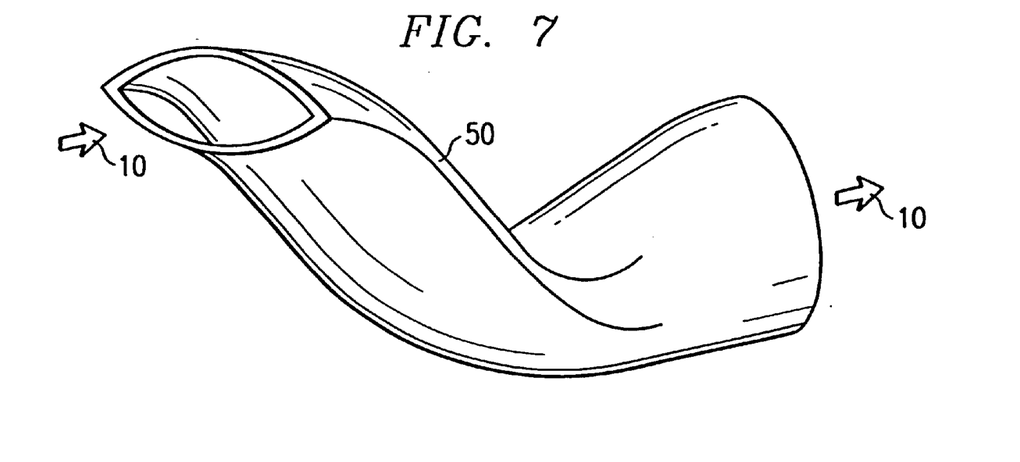
FIG. 7 depicts a low-observable duct.
Figure 8A:
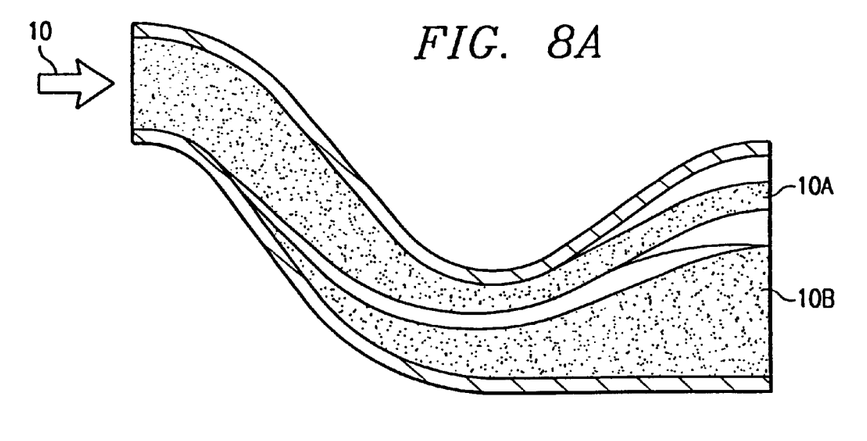
FIG. 8A depicts natural flow separation within a serpentine duct.
Figure 8B:
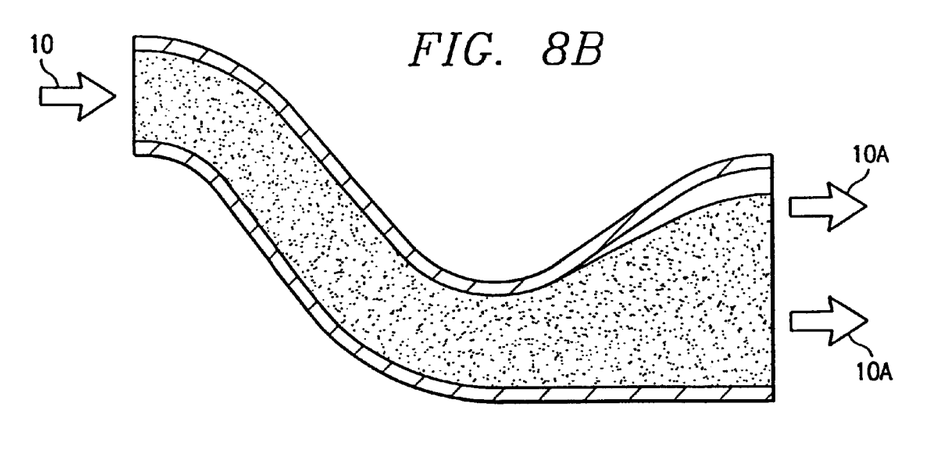
FIG. 8B depicts reduced flow separation when the present invention is employed within a serpentine duct.

FIG. 7 indicates a duct 50 of a non-conventional shape. This duct may be used in a low-observable aircraft intake or outlet exhaust, or this unconventional duct shape may be used due to space considerations in additional embodiments. The unconventionally shaped duct 50 may include an aggressive duct offset such as that employed in a low-observable aircraft design. The enhancement of fluid flow 10 within this low-observable duct 50 in an aircraft application can determine the size and weight of an all-wing vehicle and determine the propulsion system requirements and weapons or payload capabilities. Additionally, in an aircraft application, flow control can reduce cyclic fatigue of components located within fluid flow 10 such as an aircraft engine component and the like. FIGS. 8A and 8B illustrate flow separation within the serpentine duct of FIG. 7. FIG. 8A illustrates a secondary flow 10B when the present invention is not used within the serpentine duct. FIG. 8B illustrates the suppression of secondary flow when the present invention is incorporated onto the ducted surfaces of the serpentine duct.

Stress peak amplitudes experienced by a component within the fluid flow for a normal ducted flow can be greatly reduced by reducing or eliminating pressure gradients within the fluid flow 10. Controlled ducted flow reduces these pressure gradients and hence the forcing function amplitudes on a component such as an engine turban blade.

Finally, again in an aircraft application, the low-observable requirements for inlet and exhaust ducting pose significant challenges. The challenges require high aspect ratio and exotic aperture shaping of ducts or top-mounted inlets for ducts. Fluid flow control can be used to mitigate any performance impact on the aircraft. Additionally, attack geometries and sensing internal and external flow conditions at the aircraft and actively manipulating the fluid flow conditions at the aircraft to achieve desired fluid flow conditions at the aircraft will enhance dynamic conditions of the aircraft in flight. Fluid flow may be manipulated to meet several objectives including: (1) reduced component fatigue, (2) stable fluid flow within an internal ducting system, and (3) stable fluid flow external to the aircraft in dynamic geometries.

In an additional embodiment the present invention may be used to improve flow behavior in a hydrodynamic application. This may minimize head loss in a piping system, reduce flow noise within a piping system or over a submerged structure or to control and manipulate hydrodynamic flow about a watercraft for direction and thrust control.

Further embodiments of the present invention may include air handling units such as HVAC systems, chemical processors, automobile air intake manifold or biomedical applications. However, the present invention should not be limited to these applications. Rather, the present invention may be applied to any instance of a ducted flow, in particular to a diffused ducted flow.

The present invention provides a system and method for actively manipulating and controlling aerodynamic or hydrodynamic fluid flow over a surface that substantially eliminates or reduces disadvantages and problems associated with previously developed systems and methods used of fluid flow control.

More specifically, the present invention provides a system and method to control aerodynamic or hydrodynamic fluid flow behavior of a ducted fluid flow using very-small-scale effectors. The system and method for actively manipulating and controlling fluid flow over a surface includes the placement of arrays of very-small-scale effectors on ducted surfaces bounding the ducted fluid flow. These very-small-scale effectors are actively manipulated to control the flow behavior of the ducted fluid flow and prevent flow separation within the primary fluid flow. The present invention includes the use of MEMS devices as the very-small-scale effectors. In this case the very-small-scale effectors are smaller than a duct boundary layer thickness of a ducted fluid flow. Furthermore these very-small-scale effectors may be dimensioned at an order of one-tenth of the boundary layer thickness.

The present invention may further sense the flow conditions within in the primary and secondary fluid flow, with a flow sensor system. This relieves computational burdens imposed by prior art systems which failed to sense actual conditions and relied on computationally intensive mathematical models to determine the fluid flow conditions. Further, this eliminates the inaccuracies associated with such mathematical models and provides real time actual feedback. A control system is employed to actively direct the array of very-small-scale effectors in response to the sensed flow conditions to produce a desired fluid flow within said ducted fluid flow.

Actively controlling ducted fluid flow expands the possible geometries available for ducting systems used to contain such fluid flow. This is highly desirable where exotic geometries are required such as in low-observable tactical aircraft. However, the present invention need not be limited to tactical aircraft as low-observable technology has many applications as known to those skilled in the art.

Furthermore, actively controlling and manipulating a ducted fluid flow can result in reduced fatigue and cyclical stress effects on downstream components such as an aircraft engine or turbine located within the ducted fluid flow, as the adverse pressure gradients within the duct can be eliminated.

Operation of components such as an aircraft engine or turbine located within the ducted fluid flow can be enhanced by actively monitoring and controlling the fluid flow behavior to prevent operation failures such as engine stalling induced by fluid flow.

The present invention provides an important advantage by allowing a dynamic primary fluid flow to be actively manipulated by an array of very-small-scale effectors to achieve a greater pressure recovery of the primary fluid flow.

The present invention provides another advantage by prevent flow separation within a ducted or dynamic fluid flow. This is achieved by actively manipulating an array of very-small-scale effectors according to conditions sensed within the fluid flow to achieve a macroscopic effect. Individually, these very-small-scale effectors induce vortex generation at the boundary layer. These vortices induce mixing between the primary fluid flow and the secondary fluid flow. The mixing is promoted by vortices trailing longitudinally near the edge of the boundary layer. Fluid particles with high momentum in the stream direction are swept along helical paths toward the duct surface to mix with and, to some extent replace low momentum boundary layer flow. By actively controlling the vortex generation across an array of very-small-scale effectors a macro-scale influence can be achieved. This provides a macro-scale source to counter the natural growth of the boundary layer thereby eliminating adverse pressure gradients and low energy secondary flow accumulation within the fluid flow. Additionally, since the induction of these vortices is actively controlled, it is possible for the present invention to respond to changing conditions effecting the primary fluid flow.

Moreover, the present invention provides yet another advantage by allowing a greater flexibility in the design of a ducting system to be associated with the primary fluid flow. This flexibility allows both inlet and exhaust ducting to take exotic or serpentine shapes as is often required by other imposed engineering design constraints, such as those imposed by low-observable tactical aircraft.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method to manipulate flow behavior of a ducted fluid flow using static very-small-scale effectors comprising the steps of:

placing arrays of static very-small-scale effectors on ducted surfaces bounding the ducted fluid flow, and wherein said arrays are oriented substantially normal to a mean flow direction of said ducted fluid flow;

altering a secondary flow structure in a boundary layer of the ducted fluid flow with said arrays of very-small-scale effectors on said ducted surfaces wherein said arrays of static very-small-scale effectors induce secondary flows with the ducted fluid flow;

sensing flow conditions within the ducted fluid flow, with a flow sensor system; and arranging said array of static very-small-scale effectors in response to said flow conditions to produce a desired fluid flow within said ducted fluid flow.

2. The method of claim 1, wherein said static very-small-scale effectors are smaller than a duct boundary layer thickness of said ducted fluid flow.

3. The method of claim 1, wherein said static very-small-scale effectors are of an order of one-tenth said duct boundary layer thickness of said ducted fluid flow.

4. The method of claim 1, wherein said static very-small-scale effectors are microfabricated mechanical structures.

5. The method of claim 1, wherein said secondary flows are co-rotating with the ducted fluid flow.

6. The method of claim 1, wherein said secondary flows suppresses flow separation within the ducted fluid flow.

7. The method of claim 1, wherein said ducted fluid flow is within a low-observable duct.

8. The method of claim 1, wherein the ducted fluid flow reduces fatigue effects on downstream components located within the ducted fluid flow.

9. The method of claim 1, wherein the ducted fluid flow reduces fatigue effects on downstream components located within the ducted fluid flow.

10. The method of claim 8, wherein said downstream components comprise an aircraft engine.

11. A method to control flow behavior of a ducted fluid flow using static very-small-scale effectors comprising the steps of:

placing arrays of static very-small-scale effectors on ducted surfaces bounding the ducted fluid flow, and wherein said arrays are oriented substantially normal to a mean flow direction of said ducted fluid flow;

altering a secondary flow structure in a boundary layer of the ducted fluid flow with said arrays of static very-small-scale effectors on said ducted surfaces to alter flow behavior of the ducted fluid flow and wherein said static very-small-scale effectors are smaller than a duct boundary layer thickness of said ducted fluid flow, wherein said arrays of static very-small-scale effectors inducing secondary flows within the ducted fluid flow sensing flow conditions within the ducted fluid flow, with a flow sensor system; and arranging said array of static very-small-scale effectors in response to said flow conditions, to produce a desired fluid flow within said ducted fluid flow.

12. The method of claim 11, wherein said static very-small-scale effectors are of an order of one-tenth said duct boundary layer thickness of said ducted fluid flow.

13. The method of claim 11, wherein said static very-small-scale effectors are microfabricated mechanical structures.

14. The method of claim 11, wherein said secondary flows are co-rotating with the ducted fluid flow.

15. The method of claim 11, wherein said secondary flows prevent flow separation within the ducted fluid flow.

16. The method of claim 11, wherein said ducted fluid flow is within a low-observable duct.

17. The method of claim 11, wherein the ducted fluid flow reduces fatigue effects on downstream components located within the ducted fluid flow.

18. The method of claim 17, wherein said downstream components comprise an aircraft engine.

19. The method of claim 17, wherein the ducted fluid flow prevents said aircraft engine from stalling.

* * * * *

UNITED STATES PATENT AND TRADEMARK OFFICE
CERTIFICATE OF CORRECTION

PATENT NO. : 6,682,021 B1
DATED : January 27, 2004
INVENTOR(S) : Philip W. Truax et al.

It is certified that error appears in the above-identified patent and that said Letters Patent is hereby corrected as shown below:

Column 1,
Line 54, delete "these structures" and insert -- the structures --.
Line 58, delete "leaved" and insert -- leave --.

Column 2,
Line 13, delete "by".
Line 25, delete "of" and insert -- for --.

Column 3,
Line 21, delete "convention" and insert -- conventional --.

Column 4,
Line 8, delete "fludic" and insert -- fluidic --.
Line 50, delete "of" and insert -- for --.
Line 56, delete "floe" and insert -- flow --.

Column 5,
Line 19, delete "AS" and insert -- As --.
Line 26, delete "Modem" and insert -- Modern --.
Line 33, delete "diffuse" and insert -- diffused --.

Column 6,
Line 17, delete "2D" and insert -- 2C --.
Line 21, delete "2E" and insert -- 2D --.
Line 58, delete "sheer" and insert -- shear --.
Line 61, delete "flex" and insert -- flux --.

Column 7,
Line 4, delete "13" and insert -- 14 --.
Line 34, delete "turban" and insert -- turbine --.

UNITED STATES PATENT AND TRADEMARK OFFICE
CERTIFICATE OF CORRECTION

PATENT NO.    : 6,682,021 B1
DATED         : January 27, 2004
INVENTOR(S)   : Philip W. Truax et al.

It is certified that error appears in the above-identified patent and that said Letters Patent is hereby corrected as shown below:

Column 8,
Line 2, delete "of" and insert -- for --.
Line 20, delete "in".

Signed and Sealed this

Twenty-seventh Day of December, 2005

JON W. DUDAS
*Director of the United States Patent and Trademark Office*